(12) United States Patent
Benson

(10) Patent No.: US 12,092,191 B1
(45) Date of Patent: *Sep. 17, 2024

(54) TORQUE VECTOR MULTIPLIER

(71) Applicant: Steven R Benson, St. George, UT (US)

(72) Inventor: Steven R Benson, St. George, UT (US)

(*) Notice: Subject to any disclaimer, the term of this patent is extended or adjusted under 35 U.S.C. 154(b) by 0 days.

This patent is subject to a terminal disclaimer.

(21) Appl. No.: 18/380,862

(22) Filed: Oct. 17, 2023

Related U.S. Application Data

(63) Continuation of application No. 18/380,833, filed on Oct. 17, 2023.

(51) Int. Cl.
F16H 1/04 (2006.01)
F16H 1/32 (2006.01)
F16H 1/10 (2006.01)
F16H 57/04 (2010.01)

(52) U.S. Cl.
CPC ............... F16H 1/32 (2013.01); F16H 1/04 (2013.01); F16H 1/10 (2013.01); F16H 2001/327 (2013.01); F16H 57/0431 (2013.01)

(58) Field of Classification Search
CPC .......... F16H 1/32; F16H 57/0431; F16H 1/04; F16H 1/10; F16H 2001/327; B60B 27/0021
See application file for complete search history.

(56) References Cited

U.S. PATENT DOCUMENTS

| | | | |
|---|---|---|---|
| 2,540,973 A * | 2/1951 | Wallace | F16H 1/10 74/413 |
| 2,605,645 A * | 8/1952 | Tharpe | F16H 1/10 74/413 |
| 2,753,731 A * | 7/1956 | McWethy | F16D 3/76 74/413 |
| 2,851,896 A * | 9/1958 | Ordway | F04C 15/0061 74/606 R |
| 3,518,897 A | 7/1970 | Bixby | |
| 4,677,873 A | 7/1987 | Eastman | |
| 7,316,629 B2 | 1/2008 | Nakagawa | |
| 7,462,123 B2 | 12/2008 | Miller | |
| 8,226,517 B2 | 7/2012 | Tsai | |
| 9,518,642 B1 | 12/2016 | Hirao | |
| 10,807,467 B2 | 10/2020 | Rotenberg | |

FOREIGN PATENT DOCUMENTS

| | | | | |
|---|---|---|---|---|
| DE | 102012101593 B4 | * | 11/2015 | ............ F03D 80/70 |
| DE | 102019121753 A1 | * | 3/2020 | ........... B60K 17/046 |
| JP | 6601602 B2 | * | 11/2019 | ............ B60B 35/14 |
| RU | 2659359 C1 | * | 6/2018 | ............... F16H 1/10 |
| WO | WO-2019058766 A1 | * | 3/2019 | ............ B60B 35/14 |

* cited by examiner

Primary Examiner — Justin Holmes

(57) ABSTRACT

A reversible torque vector multiplier for gear reduction or gear multiplication of vehicle driveline, machinery or any rotating structure, such as an automobile or offroad vehicle. Said embodiments comprise an input structure such as an axle or driveline, an output structure such as wheel studs or a driven driveshaft, with a pinion gear and an annular or ring gear. In preferred embodiments replacement of a standardized component such as a unitary bearing hub or a carrier bearing results in gearing down or gearing up the final output speed and corresponding torque. In some applications the orientation can be swapped resulting in switching gear reduction with multiplication, and vice versa. A pinion gear with automatic lubrication channels. Apparatus and method claims are provided.

16 Claims, 10 Drawing Sheets

PRIOR ART

TORQUE VECTOR MULTIPLIER

CROSS REFERENCE TO RELATED APPLICATIONS

The present application claims priority in and to U.S. patent application Ser. No. 18/380,833 filed Oct. 17, 2023, and further is incorporated herein by reference.

TECHNICAL FIELD

The presently disclosed technology relates to gear reduction and gear multiplication through a unique structure of pinion and annular gears, and more particularly to applications where said unique structure can directly substitute a unitary bearing hub, a carrier bearing in a vehicle driveline or another standardized structure in a vehicle or machinery.

BACKGROUND

In the offroad vehicle world, it is desirable to implement gear reduction on vehicles to increase torque to the driving or driven wheels, which is often all four wheels in offroad applications. There are many solutions to provide such gear reduction, such as gear reduction in the transmission (e.g. many vehicles), gear reduction in the transfer case or axle differentials (e.g. Jeep SUVs), and also gear reduction at/near the wheels in the form of special hubs (e.g. Hummer H1 models) or portals (e.g. for UTVs).

Different forms of gear reduction are not equally desirable. It is desirable to provide such gear reduction as far downstream and close structurally to a driven wheel as possible, such as in the wheel hub itself, if attainable. That way, the remaining upstream components in the drivetrain retain their original gearing and torque specifications/loads. For example, by contrast, if gear reduction is configured at the transmission, then all downstream drivetrain components (e.g. transfer case, driveshaft, axles, etc.) enjoy less rotational speed and sustain higher torque, thus making them more susceptible to material fatigue and failure.

In UTV offroad applications, such as rock crawling, portals can be desirable as gear reduction is attained at the wheel hub. Because the gear reduction occurs at the wheel hub, all upstream components in the drivetrain (e.g. CVT joints and/or axles, differentials, drivelines, etc.) are not subjected to additional torque or stress despite the gear reduction.

However, portals have several vulnerabilities and shortcomings. In particular, portals attain gear reduction through a stack of gears of different sizes communicating and turning with one or more idler gears. Unfortunately, this configuration offers only a few teeth between the idler gear and each respective input or output gear. Frequently in the gear stack, the teeth can chip or break off leading to catastrophic failure of the portal. In an application where high torque loads are sustained (e.g. rock crawling) and reliability is paramount, portals may fail in critical moments by their weakness in design via a gear stack.

Much less, due to the significant special constraints imposed by the gear stack, portals typically add eight inches of width to the UTV's overall width, and also add roughly 40 pounds of weight per wheel hub, which totals 160 pounds to a vehicle's overall weight.

In different applications, however, such as heavy truck highway shipping, it may be desirable to have gear multiplication rather than gear reduction, to increase the speed of a rotating structure (e.g. a wheel or a driveline) with a corresponding loss in torque. Typically but not always, gear multiplication can lead to increased fuel efficiency.

In both applications described above, what is needed in the field of art is gear reduction or gear multiplication that could be accommodated through replacement of standardized components already on the application's vehicle. For example, for gear reduction, it would be highly advantageous to replace a unitary bearing in a wheel hub, with a unitary bearing which provides gear reduction. Or, by way of example, for gear multiplication or reduction, it would be highly advantageous to replace a carrier bearing in a driveline with a carrier bearing which provides gear multiplication or gear reduction, depending on the desired result.

SUMMARY

The present disclosure describes apparatus directed to replacement of a standardized component in a vehicle driveline to attain gear reduction or gear multiplication through a torque vector multiplier. Such a torque vector multiplier may be installed for reasons of gear reduction (e.g. less rotational speed, more rotational torque) or gear multiplication (e.g. more rotational speed, less rotational torque).

In one aspect, embodiments of the torque vector multiplier decrease rotational speed and correspondingly increase rotational torque as between an input structure (e.g. a female axle receiver), and an output structure (e.g. wheel lug studs or a wheel mount plate). Said torque vector multiplier preferably is affixed to the chassis of the vehicle and preferably replaces a standardized component such as a unitary bearing hub.

Embodiments of the present invention comprise a pinion assembly comprising an input structure, such as an axle receiver fixedly attached to a pinion gear, wherein the pinion gear comprises a plurality of pinion teeth facing outward. An annular assembly comprising the output structure may be fixedly attached to an annular gear, wherein the annular gear comprises a plurality of annular teeth facing inward. The plurality of teeth of the annular gear exceed in number the plurality of teeth of the pinion gear, and the plurality of pinion teeth and the plurality of annular teeth are approximately mated to each other providing for rotational communication between the pinion gear and the annular gear. Typically, in this configuration, at any given time at least four or five teeth of each gear are in constant communication with the other gear teeth.

In preferred embodiments, the thickness of the pinion gear and the annular gear are approximately the same thickness. That is, expressed in a different way, the width of the mated teeth is approximately the same in both the pinion gear and the annular gear. Although it is not critical that the pinion gear and annular gear have identical thicknesses or that their respective teeth have identical widths, but these two gears having approximately the same thickness provides efficiency of space within certain applications such as a wheel hub or carrier bearing.

A carrier assembly can be fixedly attached to a vehicle chassis, thereby situating the pinion assembly and the annular assembly in fixed positions relative to each other, while allowing corresponding rotational movement of the pinion assembly and annular assembly, such that the pinion gear remains in the same relative position relative to the annular gear.

In preferred embodiments, the carrier assembly secures the pinion gear (or the pinion assembly) and the annular gear (or the annular assembly) in a fixed orientation relative to one another, such that the pinion gear axis and the annular gear axis are parallel axes. In other words, the pinion gear and the annular gear when rotated, rotate in a same geometric plane.

When the input structure rotates the pinion gear also rotates, and the communication of the plurality of pinion teeth causes the plurality of annular teeth to turn the annular gear about the pinion gear, thereby also turning the output structure, while reducing the rotational speed and increasing the rotational torque of the output structure relative to the input structure.

As noted above, one advantage over prior art in this apparatus exists in the significant number of teeth that communicate between the pinion gear and annular gear (e.g. 4-6 or even more teeth), as contrasted against only a few teeth between stacked gears in an idler gear configuration of a portal. Further, if the unitary bearing of a wheel hub is replaced with embodiments of the present invention, the increase in width of the vehicle is about half that incurred through a prior art portal hub. Likewise, embodiments of the present invention weigh roughly half the weight of a portal, thus reducing weight extended far out on a structural member holding the wheel.

In another aspect, a torque vector multiplier can be used for increasing rotational speed and decreasing rotational torque as between an input structure such as the power side or input side of a driveline, and an output structure such as the driven or receiving or output side of a driveline. A preferred location for such an embodiment of the present invention would be replacement of a standard carrier bearing inline on the driveline.

Methods of configuring embodiments of the invention upon vehicles and machinery are also disclosed.

An improved pinion gear used in a torque vector multiplier is also disclosed.

BRIEF DESCRIPTION OF THE DRAWINGS

Embodiments of the invention are illustrated by way of example, and not by way of limitation, in the figures of the accompanying drawings and in which like reference numerals refer to similar elements, wherein.

DETAILED DESCRIPTION

Figure 1:
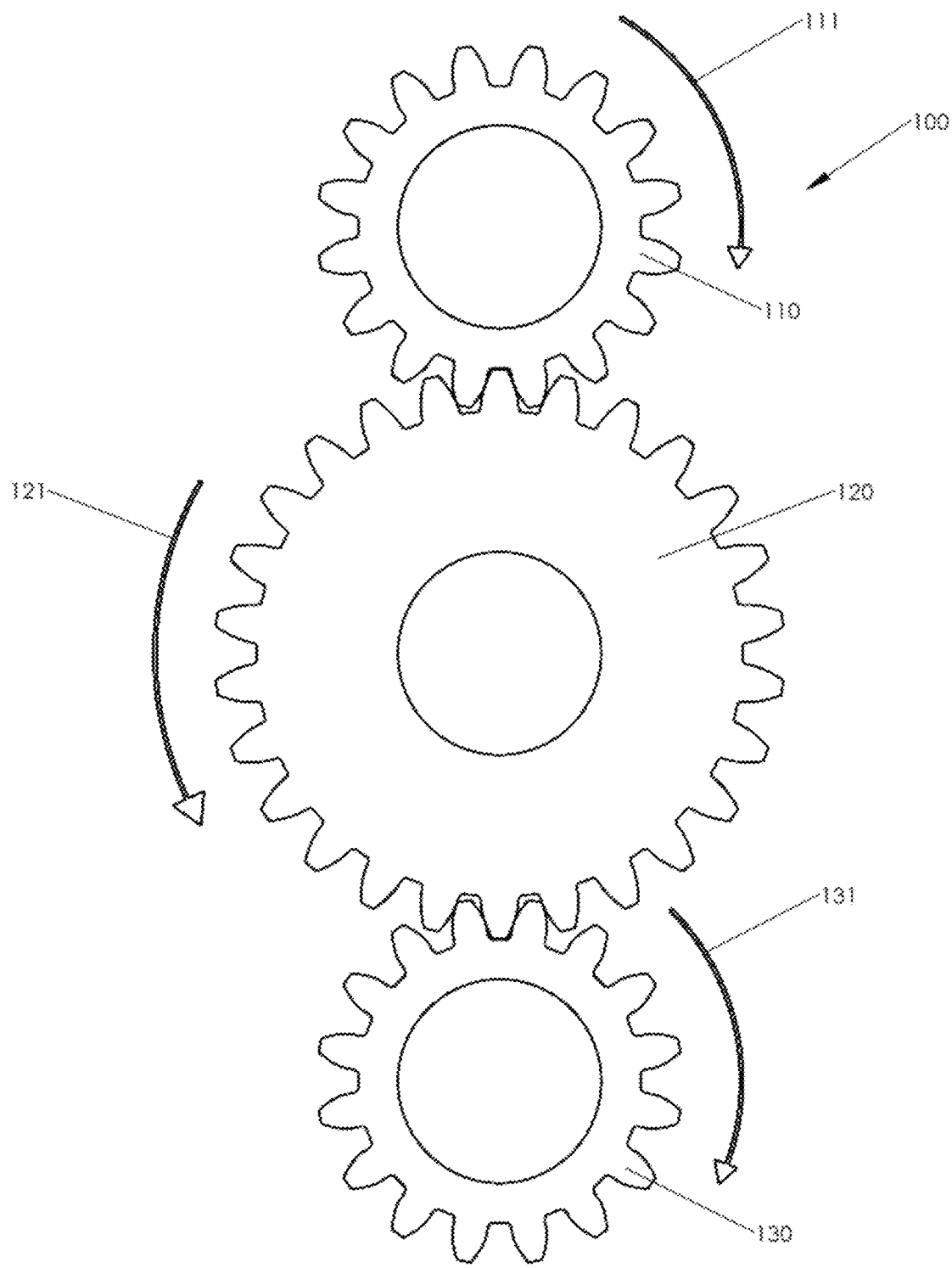
FIG. 1 is a cutaway conceptual view of a prior art embodiment of a portal utilizing stacked gears.

In the following description, for the purposes of explanation, specific details are set forth in order to provide a thorough understanding of the invention. However, it will be apparent that the invention may be practiced without these specific details. In other instances, well-known structures and devices may be depicted in block diagram form or simplified form in order to avoid unnecessary obscuring of the invention. Section titles and references appearing within the following paragraphs are intended for the convenience of the reader and should not be interpreted to restrict the scope of the information presented at any given location. As such, various aspects and features of example embodiments of the invention are described in more detail hereinafter in the following sections.

Definitions

A "pinion gear" observes the typical definitions known to those skilled in the art.

An "annular gear" (also called a "ring gear") observes the typical definitions known to those skilled in the art.

An "input structure" is the structure that provides rotational power, such as the female receiver for an axle in a UTV, or the power or input side (e.g. from the transmission) of a driveline.

An "output structure" is the structure receiving the modified rotational power that has passed through the annular and pinion gears, such as the lug plate to receive a wheel for a UTV, or the output side of a driveline.

A "pinion assembly" is comprised of structures that are related to the pinion portion of the apparatus, such as a pinion gear, etc.

An "annular assembly" is comprised of structures that are related to the annular portion of the apparatus, such as an annular gear, etc.

A "carrier assembly" or "housing" comprised of structures of the apparatus that are attached to a "static structure" or "chassis" of the application. The carrier assembly also comprises additional structures positioning a pinion gear and an annular gear in place (e.g. pinion bearing, annular bearing, etc.) and containing lubricant (e.g. seals).

"Gear reduction" or underdrive, shall be defined as decreasing rotational speed and increasing rotational torque as between a first rotating structure (e.g. an input shaft) and a second rotating structure (e.g. an output shaft), or more particularly, wherein the first rotating structure is turning faster than the second rotating structure, and wherein the second rotating structure has more rotational torque than the first structure.

"Gear multiplication" or overdrive, shall be defined as increasing rotational speed and decreasing rotational torque as between a first rotating structure (e.g. an input shaft) and a second rotating structure (e.g. an output shaft), or more particularly, wherein the first rotating structure is turning slower than the second rotating structure, and wherein the second rotating structure has less rotational torque than the first structure. To note, gear multiplication is the opposite effect of gear reduction.

An "idler gear" is a gear in communication via gear teeth with a first gear and a second gear, wherein the idler gear transfers force from the first gear to the second gear, requiring the idler gear to rotate in the opposite direction than the first gear and the second gear.

An "all terrain vehicle" as used in this disclosure is defined as a motorized off-highway vehicle designed to travel on four low-pressure tires.

A "heavy truck" as used in this disclosure is defined as a class 7 or 8 truck, or other similar weight vehicle used for hauling, farming, mining, industry or other commercial purposes.

"Reverse" and "reversible" as used in this disclosure means that a torque vector multiplier can be reversed or swapped end-to-end as to its connection locations (e.g. input structure and output structure) to provide gear multiplication rather than gear reduction, and vice versa. More particularly, the input structure and output structure of the torque vector multiplier, and the torque vector multiplier itself, can be swapped end-to-end for the reverse effect. For example, if the input structure is attached to the input end or input connection (e.g. half of a universal joint) of a driveline and the output structure is attached the output end or output connection (e.g. an identical half of a universal joint) of a driveline, to provide gear multiplication, when in a reversed orientation or swapped end-for-end the torque vector multiplier can be configured so that the said input structure is attached to the output end or output connection, and the output structure is attached to the input end or input connection, thereby providing the reverse effect or gear reduction. Such a reversible torque vector multiplier, therefore, can be installed in one direction for gear multiplication, or installed in the opposite/reverse direction for gear reduction. In preferred embodiments of a reversible torque vector multiplier, since the input structure and the output structure may be swapped to reverse the torque vector multiplier, the input structure and the output structure are identical connection points.

OVERVIEW

This disclosure presents my improved torque vector multiplier for gear reduction, which can also serve as a torque vector multiplier for gear multiplication. Embodiments of the present invention can be utilized on wheel hubs, axles or driveline components of a vehicle, utilized on an accessory shaft for farming or industrial applications, or practically on any rotating structure that has an adjacent static structure (e.g. a chassis or frame). As noted above, the context of an improved unitary bearing on a wheel hub, along with an improved carrier bearing for a driveline, has been chosen to primarily demonstrate and illustrate embodiments of the present invention. However, other vehicles such as heavy trucks, farming machines and machinery in varying contexts can be applied without departing from the spirit of embodiments of the invention.

Embodiments of my disclosed invention are intended to be configured where a rotating force is manifested in a structure such as a hub, axle, driveline, accessory shaft, etc. Embodiments can be incorporated in manufacture of the vehicle or machine, or alternatively bolted, screwed, welded, secured or attached with other conventional means to the vehicle or machine.

Torque vector multiplier embodiments of the disclosed invention provide a change in the gearing of a rotational force, either gear reduction (e.g. increased torque, decreased RPMs), or gear multiplication (e.g. increased RPMs, decreased torque).

More particularly, when such a rotational force is applied to an input structure such as a female receiver for a male axle in a vehicle, the rotational force is transferred via gear reduction or gear multiplication to the output structure, such as wheel studs or downline drivetrain components. The gear reduction or gear multiplication is bi-directional, in that the same torque and RPM modifications occur both directions equally, depending upon the direction of rotation of the input force.

Preferred embodiments of a torque vector multiplier disclosed invention generally achieve gear reduction through an input structure (e.g. axle receiver) fixedly attached to a pinion gear, the pinion gear communicating and thereby turning an annular gear, the annular gear being fixedly attached to an output structure (e.g. wheel studs). A carrier assembly takes the form of a substitute unitary bearing in a wheel hub of a vehicle. The pinion gear by virtue of its pinion-annular gear configuration exhibits significant advantages over a traditional, prior art gear stack exhibited in prior art portals.

Alternate preferred embodiments of a torque vector reducer disclosed invention generally achieve gear multiplication and increased RPMs through an input structure (e.g. upstream driveline) fixedly attached to an annular gear, the annular gear communicating and thereby turning a pinion gear, the pinion gear being fixedly attached to an output structure (e.g. downstream driveline). A carrier assembly takes the form of a substitute for a carrier bearing in a vehicle.

In preferred embodiments of a replacement for a unitary bearing in a wheel hub, the amount of gear reduction can be configured to a particular application. Excellent results have been demonstrated with gear reduction amounts from 20%-40%/For example, a pinion gear of 30 teeth and an annular gear of 40 teeth, manifests a gear reduction of approximately 25%. Such an example pair of pinion-annular gears provides for 4-5 teeth or more of communication at any time between the respective pinion and annular gears. Of course, a diversity of gearsets comprising of different gear totals can be utilized with excellent results.

Accordingly, with the reversal of the pinion and annular gears, respectively in the example above, gear multiplication can similarly be obtained utilizing a diversity of pinion and annular gearsets. And, as noted earlier, having the thickness of the pinion gear and the annular gear being approximately the same affords easier swapping of the orientation and positioning of the gears.

Various materials can be used for the components of embodiments of the disclosed invention, such as metal, plastic, carbon or other conventional manufacturing materials. In preferred embodiments, the input structure, pinion, output structure and annular gears are preferably constructed or manufactured of high-strength steel. Of course, as noted above, those components can also be constructed of other materials depending upon the application and loads/forces anticipated by the input and output structures.

In preferred embodiments, the carrier assembly also functions as a housing for the pinion assembly and annular assembly. In such preferred embodiments, the carrier assembly can therefore perform as a substitute component for a common component, such as a unitary bearing hub in a wheel, or a carrier bearing in a driveline or other machinery.

Still other features and advantages of the presently disclosed and claimed inventive concept(s) will become readily apparent to those skilled in this art from the following detailed description describing preferred embodiments of the inventive concept(s), simply by way of illustration of the best mode contemplated by carrying out the inventive concept(s). As will be realized, the inventive concepts are capable of modification in various obvious respects all without departing from the inventive concepts. Accordingly, the drawings and description of the preferred embodiments are to be regarded as illustrative in nature, and not as restrictive in nature.

DISCUSSION OF THE APPARATUS FIGURES

FIG. 1 is a cutaway concept view of a prior art embodiment of a portal 100 comprising of a plurality of stacked gears, namely an input gear 110, an idler gear 120, an output gear 130 and a housing 140.

In the portal 100, input gear 110 rotates clockwise 111, communicating and applying force to the idler gear 120 thereby causing idler gear 120 to turn counter-clockwise 121, which in turn communicates and applies force to the output gear 130 thereby causing output gear 130 to turn clockwise 131.

For the sake of comparison later within this discussion, it is noted that the prior art evidences gears turning in different directions and requires at least three bearings to secure the plurality of stacked gears. It is also worth noting spatial requirements of the housing 140 to effectively allow rotation of the plurality of stacked gears. In other applications not illustrated herein, dual idler gears can be utilized to increase strength, but increase the bearing count further and also increase spatial requirements as well.

Figure 2:
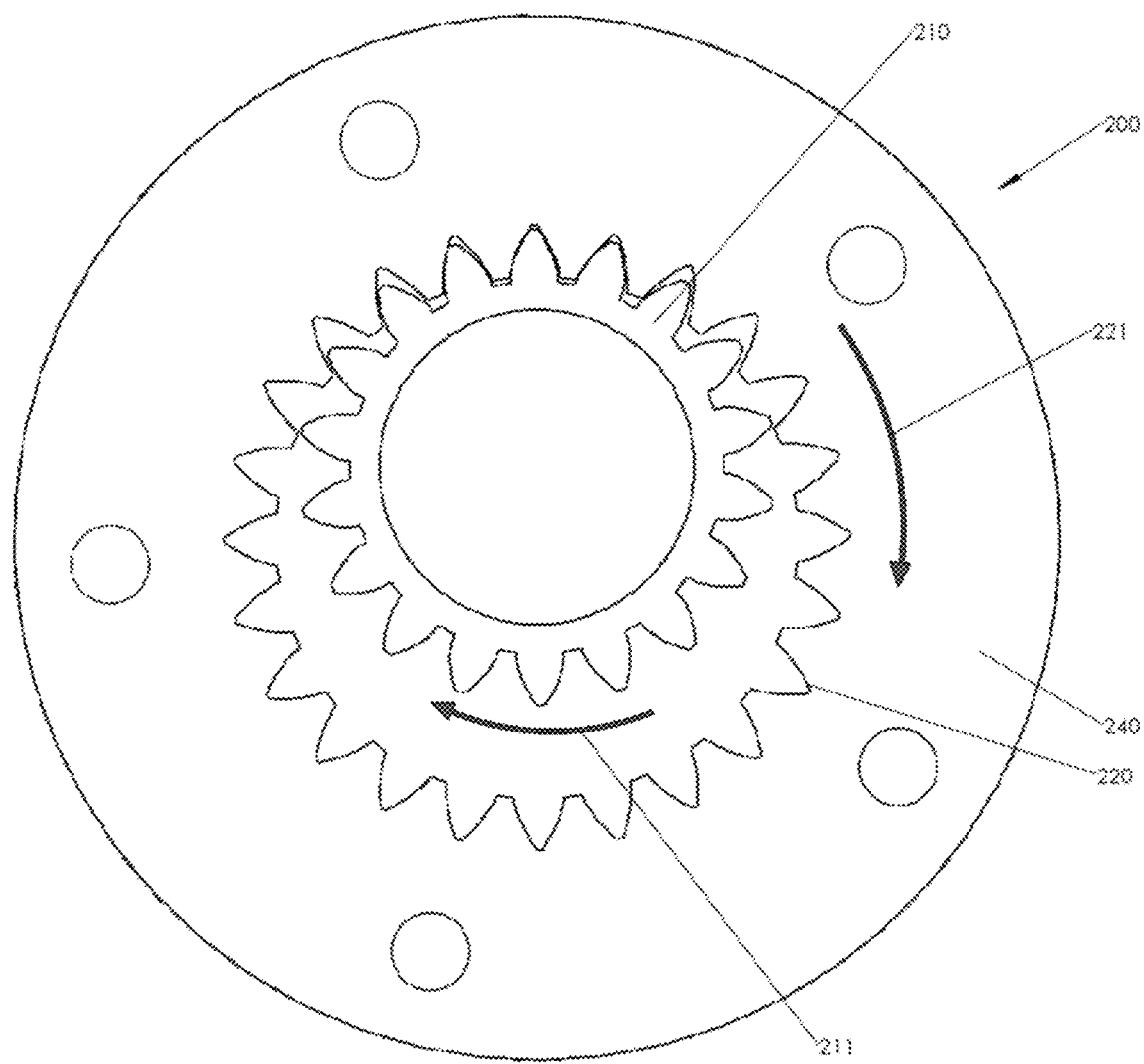
FIG. 2 is a cutaway concept front view of an embodiment of the present invention in the form of a unitary bearing hub utilizing a pinion gear and an annular gear.

FIG. 2 is a cutaway concept front view of an embodiment of the present invention in the form of a unitary bearing hub 200 comprising a pinion gear 210, an annular gear 220 and a housing 240.

In the unitary bearing hub 200, the pinion gear 210 rotates clockwise 211, communicating and applying force to the annular gear 220, thereby causing annular gear 220 to also turn clockwise 221.

In comparison to the portal 100 in FIG. 1, which has gears moving in opposite directions within a closed housing 140, the unitary bearing 200 of FIG. 2 has all gears moving in the same plane, direction and speed (as observed at the teeth of the gears), and requires only two bearings to secure the pinion gear 210 and annular gear 220. Further, the housing 240 of the unitary bearing hub 200 is spatially only required to contain and lubricate the annular gear 220 (and the pinion gear 210 located in the center of the annular gear 220), thereby reducing the spatial requirements from three stacked gears to one. In this configuration, spatial requirements are eased and the housing 240 of the unitary bearing hub 200 can take the form of a replaceable component on a vehicle, versus the prior art portal 100 which necessarily requires an increase in vehicle height and width due to the larger spatial requirements of three or more gears.

In preferred embodiments, the carrier assembly (not illustrated) secures the pinion gear 210 (or the pinion assembly) and the annular gear 220 (or the annular assembly) in a fixed orientation relative to one another, such that the pinion gear 210 axis and the annular gear 220 axis are parallel axes. In other words, the pinion gear 210 and the annular gear 220 when rotated, rotate in the same geometric plane.

Figure 3:
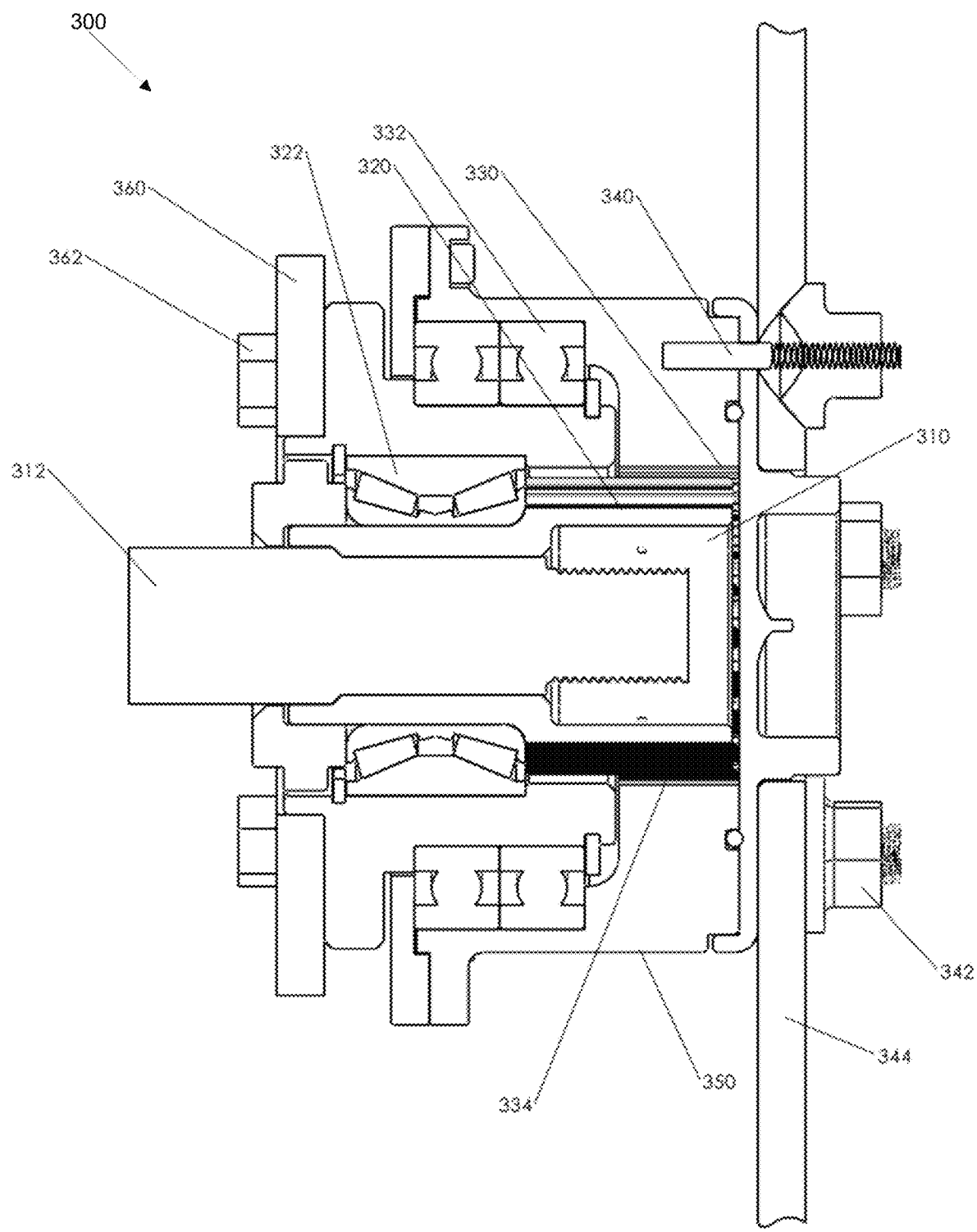
FIG. 3 is a cutaway side view of an embodiment of the present invention in the form of a unitary bearing hub utilizing a pinion gear and an annular gear.

FIG. 3 is a cutaway concept side view of an embodiment of the present invention in the form of a unitary bearing hub 300 comprising an axle receiver 310, an axle 312, a pinion gear 320, a pinion gear bearing 322, an annular gear 330, an annular gear bearing 332, a teeth communication point 334, a plurality of wheel studs 340, a plurality of lug nuts 342, a wheel 344, a carrier assembly 350, a vehicle chassis 360 and a plurality of attachment bolts 362.

Similar to the basic configuration and operation of FIG. 2, in the unitary bearing hub 300, the axle 312 communicates with an input structure which is the axle receiver 310. With the axle receiver 310 being fixably connected to the pinion gear 320, rotational force received from the axle 312 is transferred through the axle receiver 310 to the pinion gear 320. The pinion gear 320, in turn, communicates and transfers the rotational force to the annular gear 330 at the teeth communication point 334, thereby rotating the annular gear 330 in the same direction as the pinion gear 320. Since the annular gear 330 is fixably connected to an output structure which is a plurality of wheel studs 342, the plurality of wheel studs transfer rotational force from the axle 312 into the wheel 344 which is attached to the plurality of wheel studs with the plurality of lug nuts 342.

The pinion gear bearing 322 securely disposes the pinion gear 320 within the carrier assembly while providing free rotational movement, while the annular gear bearing 332 securely disposes the annular gear 330 within the carrier assembly while providing free rotational movement thereof. The pinion gear bearing 322 and annular gear bearing 332 are configure such that the pinion gear 320 and annular gear 330 rotate within the same plane, and communicate effectively at the teeth communication point 334.

The pinion gear bearing 322 and annular gear bearing 332 are disposed within the carrier assembly 350, together with their lubrication (e.g. oil, grease, etc., not illustrated).

The carrier assembly 350 is fixedly attached to the vehicle chassis 360 through a plurality of attachment bolts 362. Of course, the carrier assembly 350 can use other attachment means known in the field of art, such as welded attachment, pin attachment or any other attachment means suiting the application.

In preferred embodiments, the pinion gear 320 and the annular gear 330 are of the same approximate thickness, that is, the teeth in the teeth communication point 334 are approximately the same thickness as between the pinion gear 320 and the annular gear 330.

Further, in preferred embodiments, the carrier assembly 350 secures the pinion gear 320 and the annular gear 330 in a fixed orientation relative to one another, such that the pinion gear 320 axis and the annular gear 330 axis are parallel axes. In other words, the pinion gear 320 and the annular gear 330 when rotated, rotate in a same geometric plane.

Figure 4A:
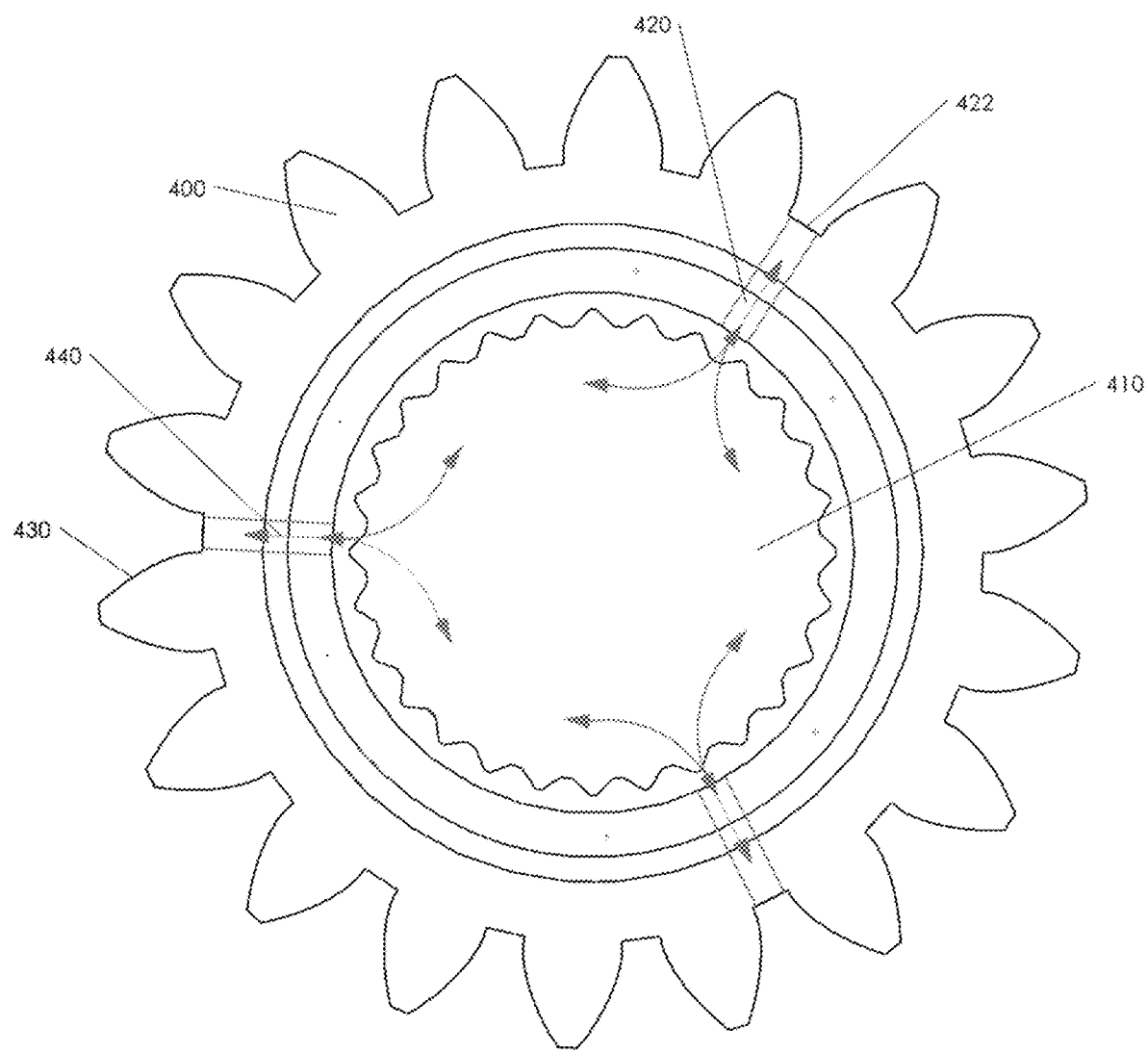
FIG. 4A is a cutaway front view of a pinion gear comprising a lubrication channel.

FIG. 4 is a cutaway front view of an improved pinion gear 400 comprising a central lubrication channel 410, a plurality of radial lubrication channels 420, a plurality of lubrication orifices 422, a plurality of gear teeth 430 and a direction of lubrication flow 440.

It is preferable to cut, drill or otherwise fabricate the central lubrication channel 410 and the plurality of radial lubrication channels 420, such that lubricant (not illustrated) can flow through the channels thereof, exit through the plurality of lubrication orifices 422 and lubricate the plurality of gear teeth 430 in the direction of lubrication flow 440.

Figure 4B:
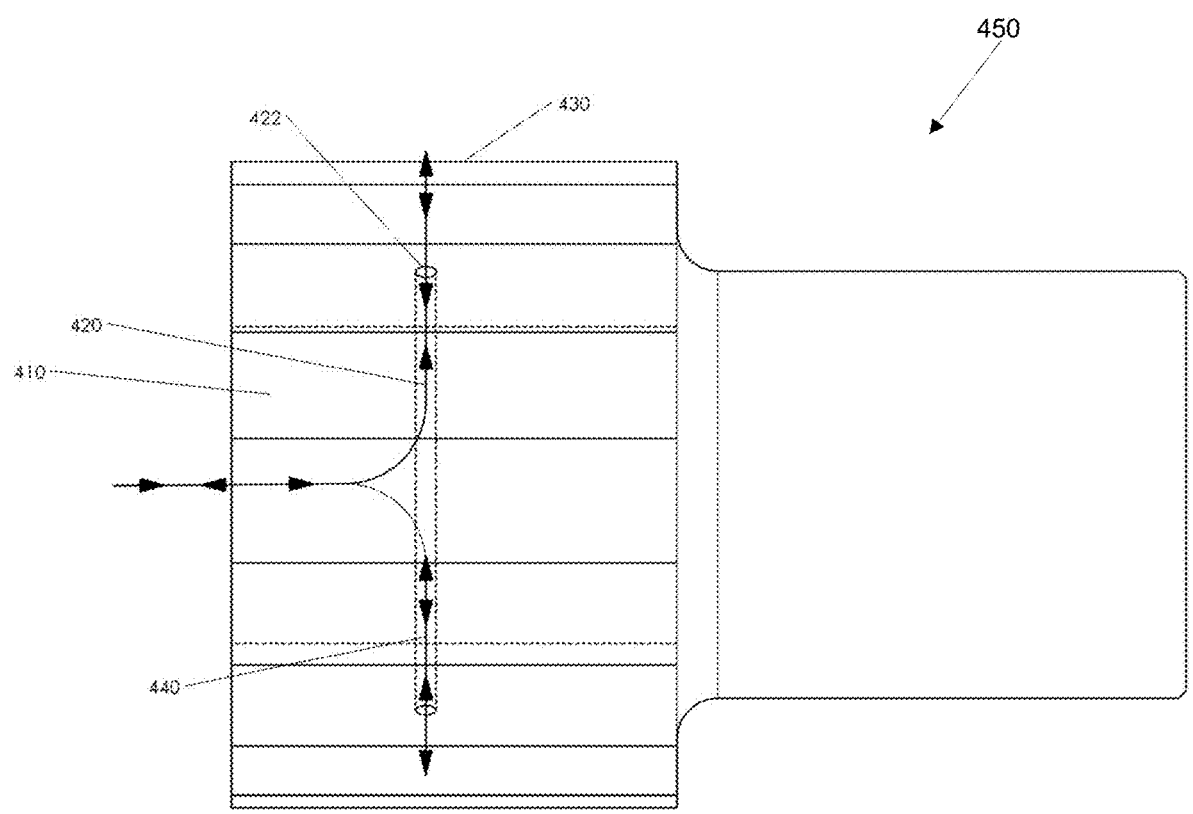
FIG. 4B is a cutaway side view of a pinion gear comprising a lubrication channel.

FIG. 4B is a cutaway side view of an improved pinion gear 400 comprising similar elements described in FIG. 4, namely a central lubrication channel 410, a plurality of radial lubrication channels 420, a plurality of lubrication orifices 422, a plurality of gear teeth 430 and a direction of lubrication flow 440.

In FIG. 4B which is a side view orientation of the pinion gear 450, the central lubrication channel 410 can be more visually depicted.

The lubrication channel elements described above effectively encourage a consistent and efficient means of lubricating the plurality of gear teeth between the pinion gear 400 or 450 and an annular gear (not illustrated) surrounding it. The lubrication occurs without additional necessary power or apparatus, and automatically discharges lubrication in approximate volume corresponding to the relative rotational speed of the pinion gear 400 or 450, due to pressures exerted by gears 430, inertial forces of lubricant (not illustrated) in the plurality of radial lubrication channels pulling the lubricant in the direction of lubrication flow 440, and other internal forces within or in the environment of the pinion gear 400 or 450.

DISCUSSION OF THE METHOD FIGURES

Figure 5:
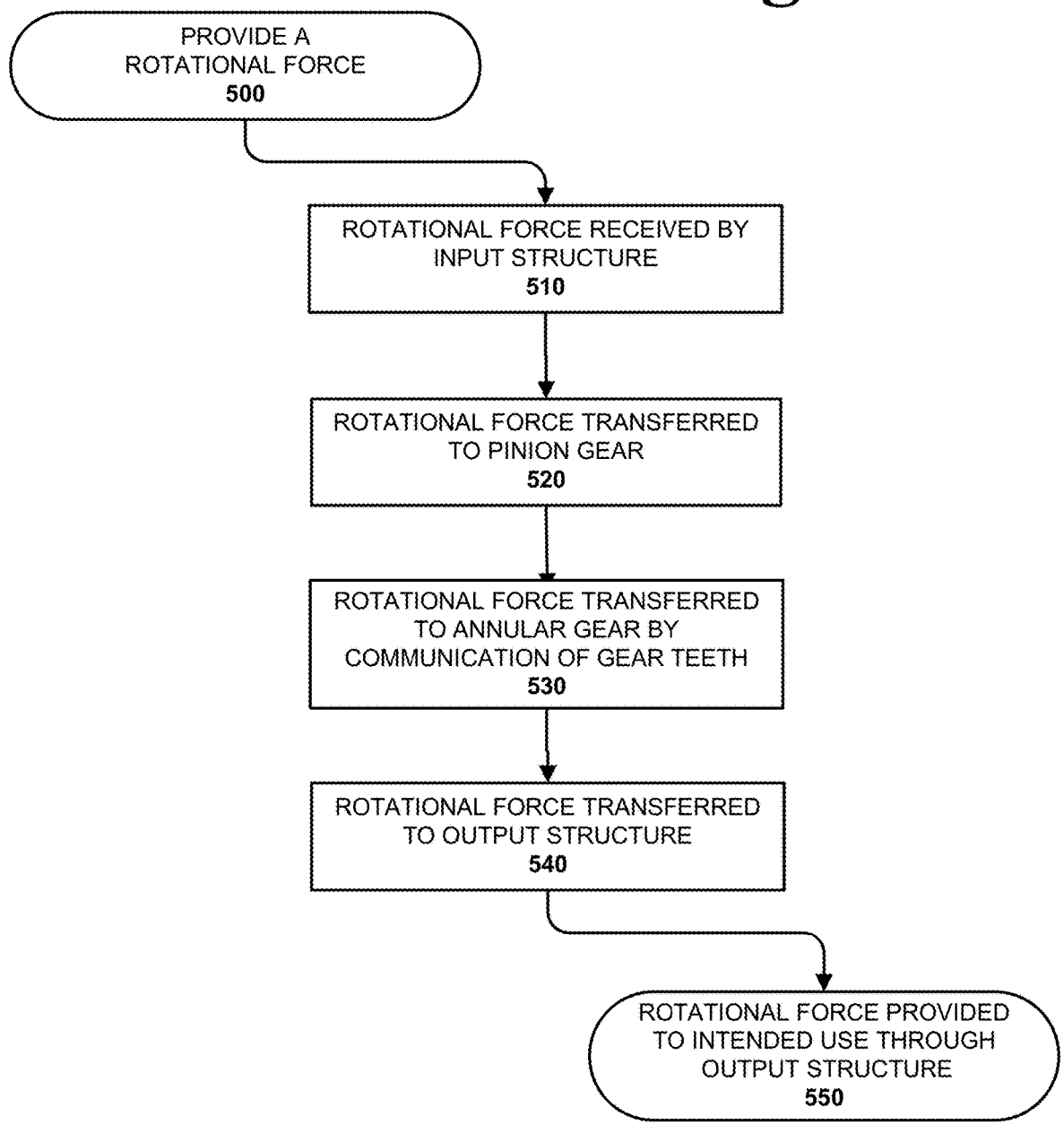
FIG. 5 is a flow chart illustrating a method of gear reduction according to an embodiment of the present invention.

FIG. 5 is a flowchart illustrating a method of gear reduction according to an embodiment of the present invention, such as that described by the preferred embodiment, a replacement gear reduction hub on a vehicle, comprising the following steps.

In step 500, the method commences by providing a rotation force, such as the rotational force exhibited in a male end of an axle of a driven wheel of the vehicle.

In step 510, the rotational force in step 500 is received by an input structure, such as a female axle receiver.

In step 520, the input structure, which is fixably configured to a pinion gear, transfers the rotational force to the pinion gear.

In step 530, the pinion gear via its gear teeth communicates with an annular gear via mated gear teeth, thereby transferring the rotational force to the annular gear.

In step 540, the annular gear, which is fixably configured to an output structure, transfers the rotational force to the output structure.

In step 550, the rotational force of the output structure is provided for the intended use, such as wheel studs, wheel stud plate, etc., which completes the method.

Figure 6:
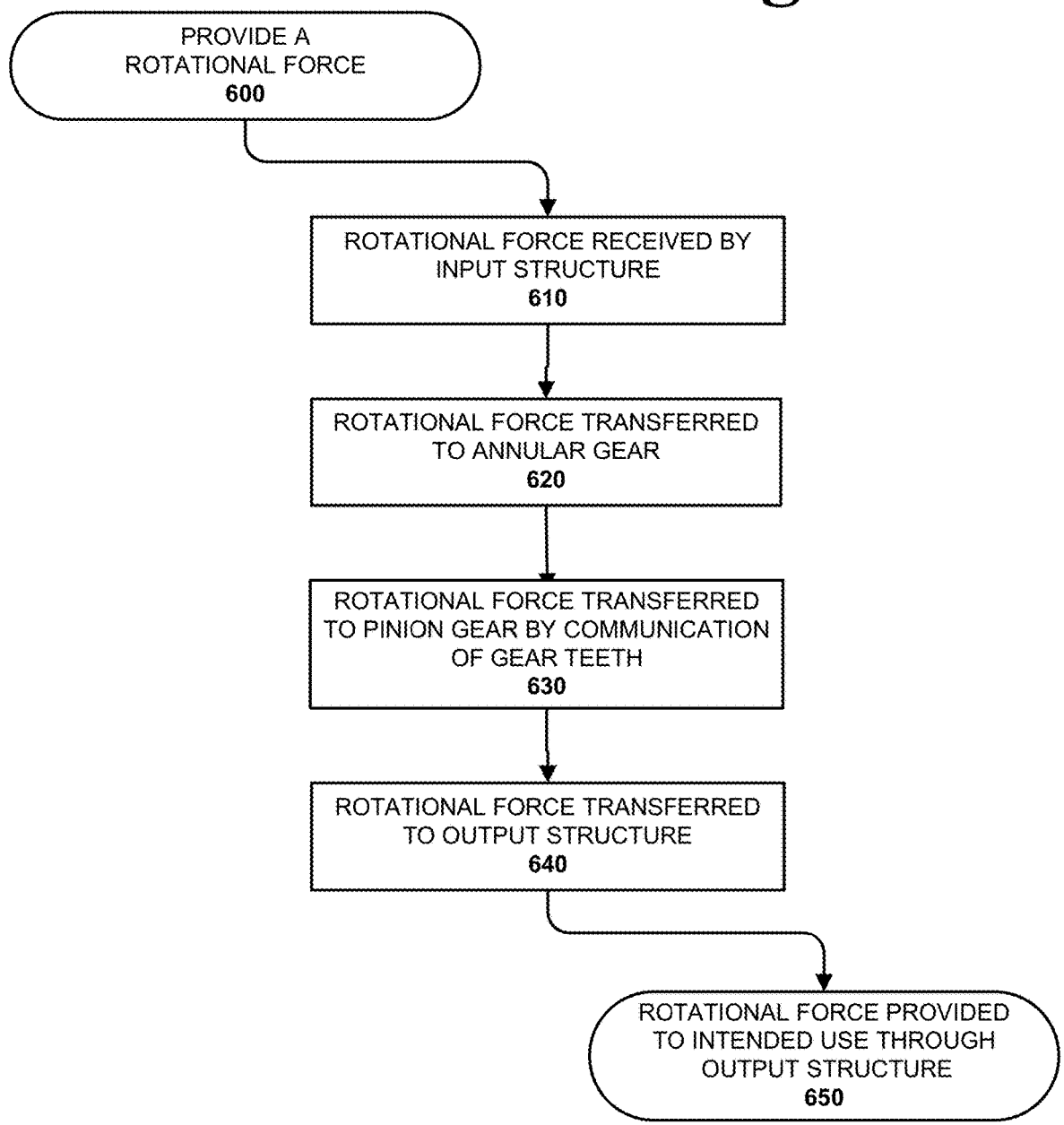
FIG. 6 is a flow chart illustrating a method of gear multiplication according to an embodiment of the present invention.

FIG. 6 is a flowchart illustrating a method of gear reduction according to an embodiment of the present invention, such as that described by an alternate embodiment, namely a gear overdrive carrier bearing replacement mounted on a driveline of a vehicle, comprising the following steps.

In step 600, the method commences by providing a rotation force, such as the rotational force exhibited on a universal joint of a driveline of the vehicle.

In step 610, the rotational force in step 600 is received by an input structure, such as a receiving universal joint of a carrier bearing.

In step 620, the input structure, which is fixably configured to an annular gear inside the carrier bearing, transfers the rotational force to the annular gear.

In step 630, the annular gear via its gear teeth communicates with a pinion gear via its gear teeth, thereby transferring the rotational force to the pinion gear.

In step 640, the pinion gear, which is fixably configured to an output structure such as a universal joint of an output driveline shaft, transfers the rotational force to the output structure.

In step 650, the rotational force of the output structure is provided for the intended use, such as a downstream driveline shaft connected to the wheels, a differential, etc., which completes the method.

Figure 7:
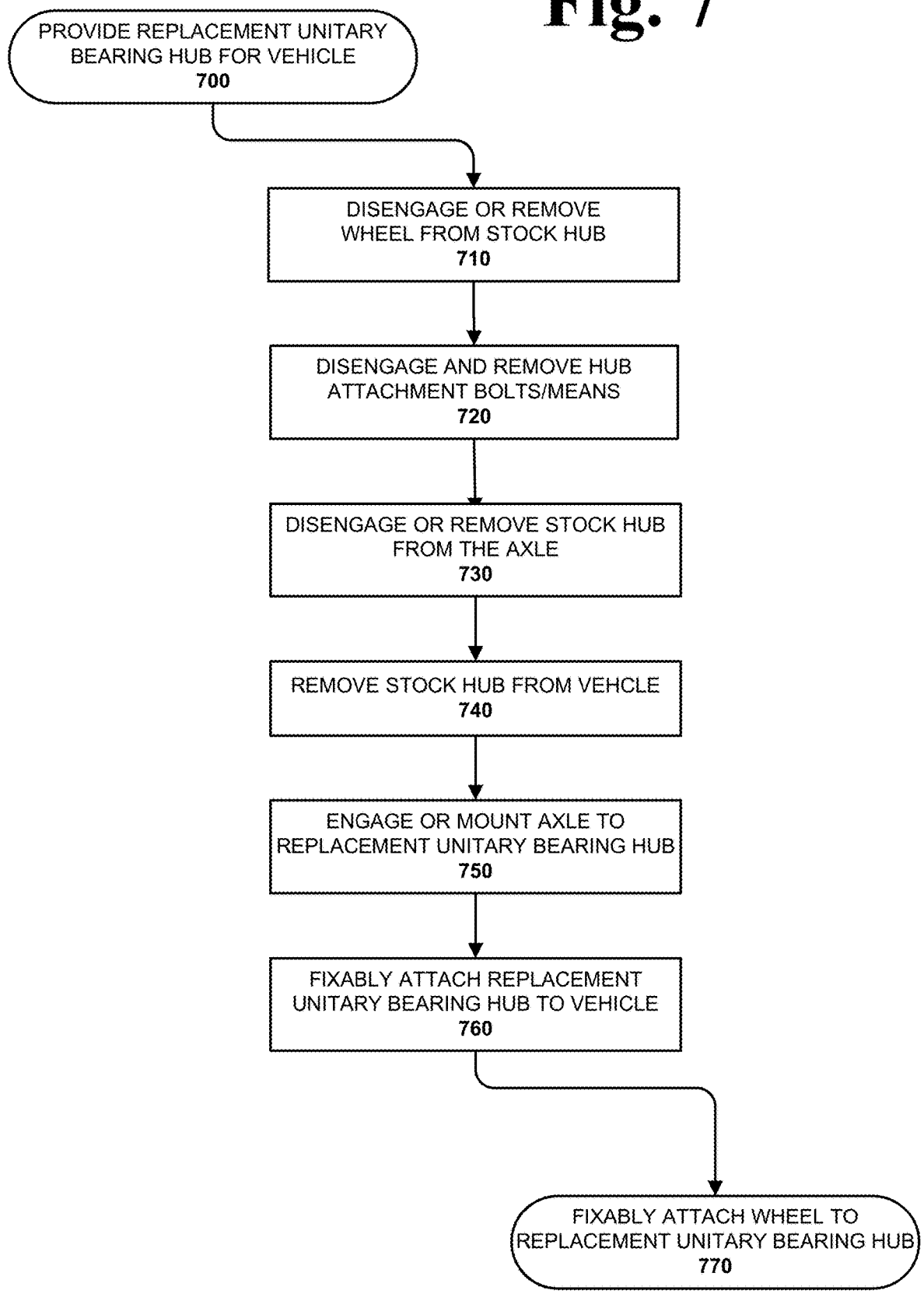
FIG. 7 is a flow chart illustrating a method of replacement of a stock unitary bearing hub with an improved replacement unitary bearing hub according to an embodiment of the present invention.

FIG. 7 is a flowchart illustrating a method of gear reduction according to an embodiment of the present invention, such as that described by the preferred embodiment, replacing a stock unitary bearing hub on a vehicle with a replacement unitary bearing hub according to an embodiment of the present invention. The method comprises the following steps.

In step 700, the method commences by providing a preferred embodiment of the present invention, such as a replacement unitary bearing hub suitable for a vehicle comprising a stock unitary bearing hub (e.g. a 2023 Polaris Pro-R UTV).

In step 710, any output apparatus (e.g. a wheel) fixably attached to an output structure of the stock unitary bearing hub is disengaged or otherwise removed from the stock unitary bearing hub.

In step 720, disengage and remove any hub attachment bolts (e.g. bolts attaching the hub to the vehicle chassis) or other attachment means connecting the stock unitary hub to the chassis are removed.

In step 730, an input structure (e.g. female receiver for axle of the stock unitary hub) is disengaged or removed from any input apparatus (e.g. a male end of an axle) on the vehicle.

In step 740, the stock unitary bearing hub is removed from the vehicle. Note that this step may happen simultaneous with step 730, as removing the stock unitary hub from the vehicle may happen simultaneously while the axle is disengaged from the stock unitary hub.

In step 750, the input structure (e.g. female receiver for axle) of the replacement unitary bearing hub is engaged or mounted to the input apparatus (e.g. male end of axle) of the replacement unitary bearing hub.

In step 760, the replacement unitary bearing hub is fixably attached to the vehicle (e.g. attached to its chassis).

In step 770, the output apparatus (e.g. the wheel) is fixably attached to the output structure of the replacement unitary bearing hub, and the process is completed.

ALTERNATE EMBODIMENTS

In closing, it is to be understood that the embodiments of the invention disclosed herein are illustrative of the principles of the present invention. Other modifications that may be employed are within the scope of the invention.

Figure 8:
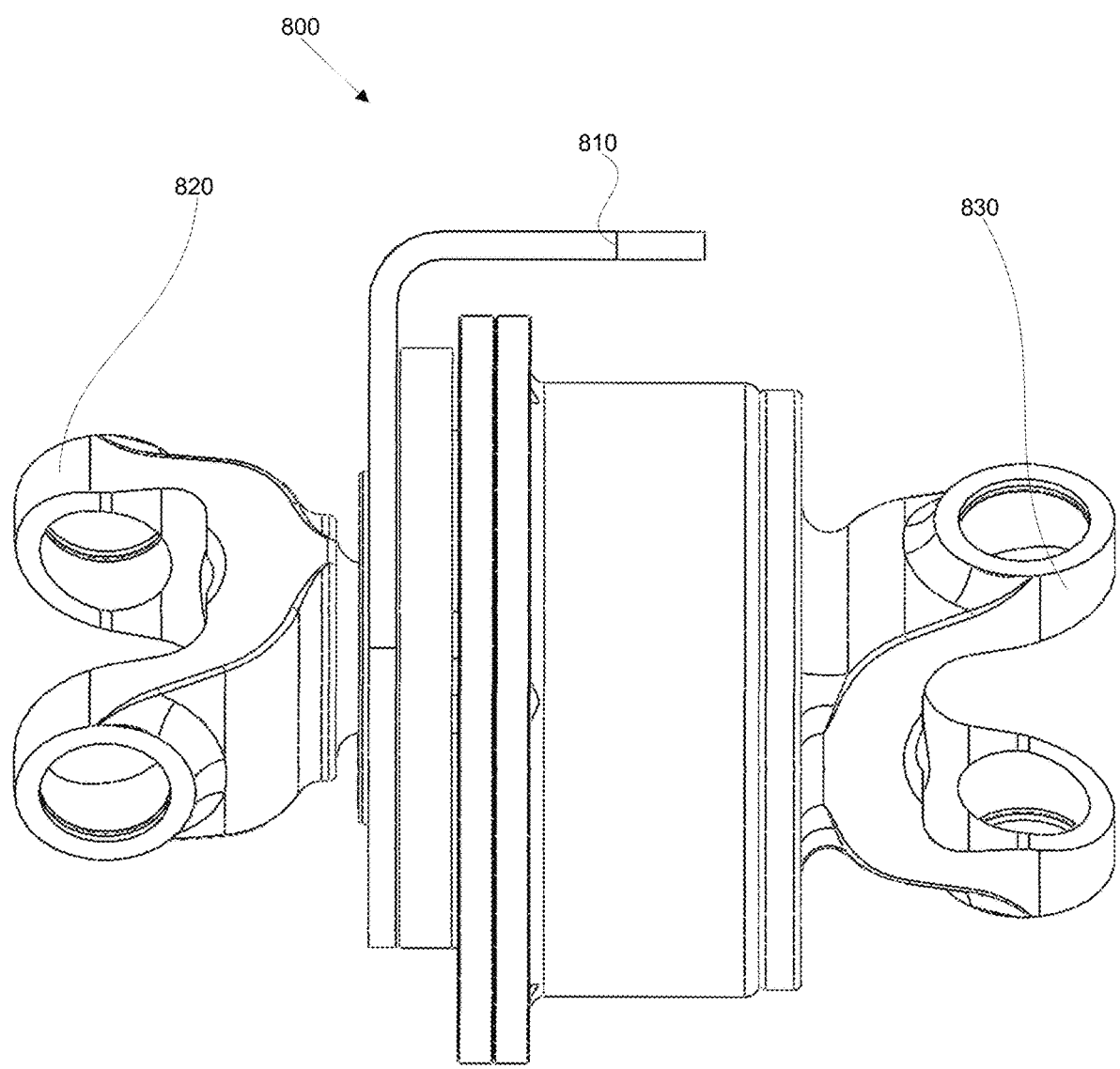
FIG. 8 is a conceptual view of an embodiment of the present invention, namely a driveline carrier bearing offering gear reduction suitable to be mounted on the bottom of a vehicle.

For example, turning to FIG. 8, a replacement carrier bearing 800 comprises a carrier assembly 810, a pinion assembly end 820 and an annular assembly end 830. The replacement carrier bearing 800 can be mounted inline with a driveline (not shown) using the pinion assembly end 820 connected to an input driveline (not shown) and the annular assembly end 830 connected to an output driveline (not shown). The replacement carrier bearing 800 can be mounted to a bottom of a chassis of a vehicle (not shown) using the carrier assembly 810.

When mounted on the driveline (not shown), the replacement carrier bearing 800 affords gear reduction as illustrated, as the pinion assembly end 820 is fixably attached to an internal pinion gear (not shown), with the annular assembly end 830 being fixably attached to an internal annular gear (not shown). Therefore, with said gear reduction, in relative terms the pinion assembly end 820 will turn more revolutions than the annular assembly end 830, and respectively the input driveline turns more revolutions than the output driveline, resulting in gear reduction across the improved carrier bearing 800.

Figure 9:
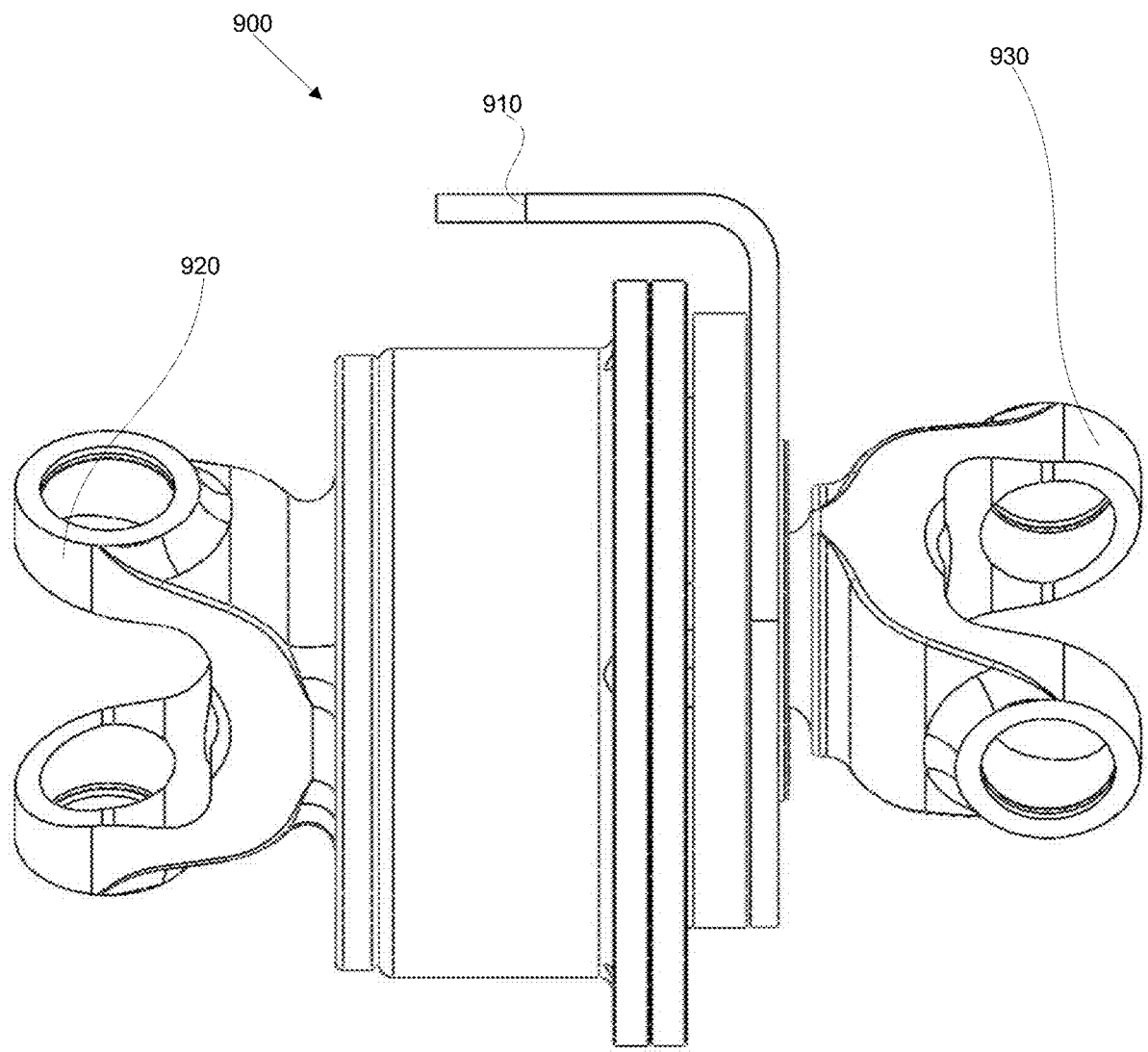
FIG. 9 is a conceptual view of an embodiment of the present invention, namely a driveline carrier bearing offering gear multiplication suitable to be mounted on the bottom of a vehicle.

It is further noted that the approximate location of the reference line 810 is halfway between the pinion assembly end 820 and the annular assembly end 830, which allows the orientation of the replacement carrier bearing 800 to be swapped end-for-end, and still installed on the same driveline on the same vehicle, as illustrated in FIG. 9.

Turning to FIG. 9, a replacement carrier bearing 900 comprises an identical replacement carrier bearing 800 of FIG. 8, but swapped end-for-end for an application of gear multiplication (rather than gear reduction in FIG. 8). More particularly, replacement carrier bearing 900 comprises a carrier assembly 910, an annular assembly end 920 (noting this was the annular assembly end 830 in FIG. 8) and a pinion assembly end 930 (noting this was the pinion assembly end 820 in FIG. 8).

Similar to FIG. 8, the replacement carrier bearing 900 in FIG. 9 can be mounted inline with a driveline (not shown) using the annular assembly end 920 and pinion assembly end 930. The replacement carrier bearing 900 can be mounted to a bottom of a chassis of a vehicle (not shown) using the carrier assembly 910.

When mounted on the driveline (not shown), the replacement carrier bearing 900 in FIG. 9 now affords gear multiplication (rather than gear reduction as oriented in FIG. 8), since the annular assembly end 920 is fixably attached to an internal annular gear (not shown), with the pinion assembly end 930 being fixably attached to an internal pinion gear (not shown). Therefore, with said gear multiplication, in relative terms the annular assembly end 920 will turn fewer revolutions than the pinion assembly end 930, and respectively the input driveline turns fewer revolutions than the output driveline, resulting in gear multiplication across the improved carrier bearing 900.

In preferred embodiments, such a replacement carrier bearing of a standard component on a vehicle affords either gear reduction or gear multiplication, depending upon the orientation that the replacement carrier bearing is installed. For example, by way of example, the replacement carrier bearing could afford gear reduction of 20% or afford gear multiplication of 20%, depending upon which direction the replacement carrier bearing is installed in the driveline of the vehicle. This allows, for example, a heavy truck to enjoy gear reduction with more torque for short heavy local loads up and down hills. Or, the same replacement carrier bearing can be swapped end-for-end and re-installed in the same heavy truck, allowing for gear multiplication for improved highway mileage.

Similar designs of standard components such as hubs or bearings can be used in farming, industrial or other applications where gear reduction or gear multiplication is desired, and a replacement component such as a hub, bearing or other rotating mechanical component can be replaced with embodiments of the present invention.

Accordingly, the present invention is not limited to that precisely as shown and described. Thus, by way of example, but not of limitation, alternative configurations of the present invention may be utilized in accordance with the teachings herein.

CONCLUSION

There are numerous and diverse additional embodiments anticipated by the present invention. Therefore, it is further understood that the following examples are not limiting by nature, but rather alternate specific examples where the disclosed apparatus and method can be utilized.

The novel and useful approaches described herein evidence a variety of benefits over prior art approaches. Embodiments of the present invention provide one or more additional aspects of enhanced convenience, usability and reliability over the prior art.

Preferred embodiments of this invention are described herein, including the best mode known to the inventors for carrying out the invention. As can be appreciated from the technical disclosure herein, embodiments of the present invention evidence a variety of advances and benefits over the prior art, uniquely and advantageously yielding savings of time, effort, and cost relative to the existing prior art currently utilized. Of course, variations on those preferred embodiments will become apparent to those of ordinary skill in the art upon reading the foregoing description. The inventor expects skilled artisans to employ such variations as appropriate, and the inventors intend for the invention to be practiced otherwise than specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context. The terms "a" and "an" and "the" and similar referents used in the context of describing the invention (especially in the context of the following claims) are to be construed to cover both the singular and the plural, unless otherwise indicated herein or clearly contradicted by context. Recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g. "such as") provided herein is intended merely to better illuminate the invention and does not pose a limitation on the scope of the invention otherwise claimed. No language in the specification should be construed as indicating any non-claimed element essential to the practice of the invention. Groupings of alternative elements or embodiments of the invention disclosed herein are not to be construed as limitations. Each group member may be referred to and claimed individually or in any combination with other members of the group or other elements found herein.

Furthermore, if any references have been made to patents and printed publications in this specification, then each of the above cited references and printed publications, if any, are herein individually incorporated by reference in their entirety.

In closing, it is to be understood that the embodiments of the invention disclosed herein are illustrative of the principles of the present invention. Other modifications that may be employed are within the scope of the invention. Thus, by way of example, but not of limitation, alternative configurations of the present invention may be utilized in accordance with the teachings herein. Accordingly, the present invention is not limited to that precisely as shown and described.

LITERAL IMPLEMENTATIONS

In one aspect, disclosed is a torque vector multiplier for gear reduction between an input structure and an output structure, comprising: a pinion assembly comprising the input structure fixedly attached to a pinion gear, wherein the pinion gear comprises a plurality of pinion teeth facing outward; an annular assembly comprising the output structure fixedly attached to an annular gear, wherein the annular gear comprises a plurality of annular teeth facing inward; wherein the plurality of teeth of the annular gear exceeds in number the plurality of teeth of the pinion gear, and the plurality of pinion teeth and the plurality of annular teeth are approximately mated to each other providing for rotational communication between the pinion gear and the annular gear; wherein the pinion gear and the annular gear are approximately the same thickness; a carrier assembly that can be fixedly attached to a static structure, comprising a pinion bearing providing the pinion gear to rotate about its axis and an annular bearing providing the annular gear to gear to rotate about its axis and wherein the pinion gear and annular gear rotate in a same plane with parallel axes; wherein the carrier assembly situating the pinion assembly and the annular assembly in fixed positions relative to each other, but allowing corresponding rotational movement of the pinion assembly and annular assembly, such that the pinion gear remains in the same relative position relative to the annular gear; wherein when the input structure rotates the pinion gear also rotates, and the communication of the plurality of pinion teeth causes the plurality of annular teeth to turn the annular gear about the pinion gear, thereby reducing the rotational speed and increasing the rotational torque of the output structure relative to the input structure.

The input structure can be a female axle receiver, the output structure can be a plurality of wheel studs, and the static structure can be a chassis of a vehicle. The torque vector multiplier can replaced a unitary bearing hub in a vehicle. The vehicle can be an all-terrain vehicle. The gear reduction ratio between the female axle receiver and the plurality of wheel studs can be 25%. In preferred embodiments, all gears internal to the torque vector multiplier rotate in the same direction. In preferred embodiments, the torque vector multiplier does not contain any idler gears. In preferred embodiments, there is a plurality of all teeth, the plurality of all teeth comprising the plurality of pinion teeth and the plurality of annular teeth, wherein the plurality of all teeth mated and communicating as between any two internal gears of the torque vector multiplier is always at least 4 teeth. The annular gear can be fixedly attached to the input structure rather than the output structure, and the pinion gear is fixedly attached to the output structure rather than the input structure, thereby providing gear multiplication rather than gear reduction between an input structure and an output structure.

In a second aspect, disclosed is a method for gear reduction between an input structure to an output structure, comprising: providing a torque vector multiplier, the torque vector multiplier comprising a pinion assembly, an annular assembly and a carrier assembly, wherein the pinion assembly comprises a pinion gear comprising a plurality of outward facing pinion teeth, wherein the pinion gear is fixedly attached to the input structure, wherein the annular assembly comprises an annular gear comprising a plurality of inward facing annular teeth, wherein the annular assembly is fixedly attached to the output assembly, wherein the pinion gear and the annular gear are approximately the same thickness, and wherein the carrier assembly comprises a pinion bearing providing the pinion gear to rotate about its axis and an annular bearing providing the annular gear to gear to rotate about its axis and wherein the pinion gear and annular gear rotate in a same plane with parallel axes; providing a rotational force to the input structure; transferring the force from the input structure to the pinion gear via the pinion assembly; transferring the force from the pinion gear to the plurality of pinion teeth; transferring the force from a lesser plurality of pinion teeth to a greater plurality of the annular teeth, the plurality of pinion teeth being mated to the plurality of annular teeth, thereby reducing the speed and increasing the torque of the force; transferring the force from the plurality of annular teeth to the annular gear; and, transferring the force from the annular gear to the output structure via the annular assembly.

The above method may also comprise a step of replacing a standard unitary bearing hub in a vehicle with the torque vector multiplier after the step of providing a torque vector multiplier. All gears internal to the torque vector multiplier preferably rotate in the same direction, and the torque vector multiplier does not comprise any idler gears. Preferably, the minimal number of teeth mated and engaged as between any two respective internal gears internal to the torque vector multiplier is at least 4 teeth. Preferably, the input structure and the output structure can be structurally swapped, more specifically the input structure can be fixedly attached to the annular gear, and the output structure can be fixedly attached to the pinion gear, with the annular gear transferring the rotational force to the pinion gear, thereby providing gear multiplication rather than gear reduction between the input structure and the output structure.

In a third aspect, disclosed is a method for gear reduction of a vehicle with a stock unitary bearing hub, comprising: providing a replacement unitary bearing hub, the replacement unitary bearing hub comprising a pinion assembly, an annular assembly and a carrier assembly, wherein the pinion assembly comprises an input structure and a pinion gear comprising a plurality of outward facing pinion teeth, wherein the annular assembly comprises an output structure and an annular gear comprising a plurality of inward facing annular teeth, wherein the pinion gear and the annular gear are approximately the same thickness, and wherein the carrier assembly is fixedly attached to the vehicle through one or more hub attachment bolts; removing a wheel from a stock unitary bearing hub; removing the one or more hub attachment bolts, thereby allowing the stock unitary bearing hub to be disengaged and removed from the vehicle; disengaging or removing the stock unitary bearing hub from an axle on the vehicle; removing the stock unitary bearing hub from the vehicle; engaging or mounting the axle to the replacement unitary bearing hub; fixedly attaching the replacement unitary bearing hub to the vehicle; and, fixedly attaching the wheel to the replacement unitary bearing hub.

In preferred embodiments of the third aspect, the axle can comprise a male end, wherein the replacement unitary bearing hub can comprise a female axle receiver, and wherein the female axle receiver can receive the axle. The vehicle can be an all-terrain vehicle. The torque vector multiplier can further comprise a plurality of internal gears, wherein the plurality of internal gears all rotate in the same direction, and wherein the torque vector multiplier preferably does not comprise any idler gears. Preferably, the plurality of internal gears comprises a plurality of teeth mated and engaged between the plurality of internal gears, wherein the plurality of teeth communicating at any given time is at least 4 teeth. The gear reduction ratio between the axle and the wheel can be 25%.

In a fourth aspect, disclosed is a reversible torque vector multiplier for gear multiplication between an input structure and an output structure, comprising: an annular assembly comprising the input structure fixedly attached to an annular gear, wherein the annular gear comprises a plurality of pinion teeth facing inward; a pinion assembly comprising the output structure fixedly attached to a pinion gear, wherein the pinion gear comprises a plurality of annular teeth facing outward; wherein the plurality of teeth of the annular gear exceeds in number the plurality of teeth of the pinion gear, and the plurality of pinion teeth and the plurality of annular teeth are approximately mated to each other providing for rotational communication between the annular gear and the pinion gear; wherein the pinion gear and the annular gear are approximately the same thickness; a carrier assembly that can be fixedly attached to a static structure, comprising a pinion bearing providing the pinion gear to rotate about its axis and an annular bearing providing the annular gear to gear to rotate about its axis and wherein the pinion gear and annular gear rotate in a same plane with parallel axes; wherein the carrier assembly situating the pinion assembly and the annular assembly in fixed positions relative to each other, but allowing corresponding rotational movement of the pinion assembly and annular assembly, such that the pinion gear remains in the same relative position relative to the annular gear; wherein when the input structure rotates the annular gear also rotates, and the communication of the plurality of pinion teeth causes the plurality of annular teeth to rotate the pinion gear within the annular gear, thereby rotating the output structure; and, wherein the input structure and the output structure are structurally identical such that they can be swapped.

In the above aspect, the input structure can be an input connector of a vehicle driveline and the output structure can be an output connector of the vehicle driveline. The reversible torque vector multiplier can replace a carrier bearing in a vehicle driveline. The vehicle can be a heavy truck. The reversible torque vector multiplier can be reversible, providing for either gear multiplication or gear reduction. Preferably, the reversible torque vector multiplier does not contain any idler gears. Preferably, all gears internal to the reversible torque vector multiplier rotate in the same direction. The gear multiplier ratio between the input connector and the output connector can be 25%. In the aspect there is a plurality of all teeth, the plurality of all teeth comprising the plurality of pinion teeth and the plurality of annular teeth, wherein the plurality of all teeth mated and communicating as between any two internal gears of the torque vector multiplier preferably is always at least 4 teeth.

In a fifth aspect, disclosed is a method for gear multiplication between an input structure to an output structure, comprising: providing a reversible torque vector multiplier, the reversible torque vector multiplier comprising an annular assembly, a pinion assembly and a carrier assembly, wherein the annular assembly comprises an annular gear comprising a plurality of inward facing annular teeth, wherein the annular gear is fixedly attached to the input structure, wherein the pinion assembly comprises a pinion gear comprising a plurality of outward facing pinion teeth, wherein the pinion assembly is fixedly attached to the output assembly, wherein the pinion gear and the annular gear are approximately the same thickness, and wherein the carrier assembly comprises a pinion bearing providing the pinion gear to rotate about its axis and an annular bearing providing the annular gear to gear to rotate about its axis and wherein the pinion gear and annular gear rotate in a same plane with parallel axes; providing a rotational force to the input structure; transferring the force from the input structure to the annular gear via the annular assembly; transferring the force from the annular gear to the plurality of pinion teeth; transferring the force from a greater plurality of annular teeth to a lesser plurality of the pinion teeth, the plurality of annular teeth being mated to the plurality of pinion teeth, thereby providing gear multiplication; transferring the force from the plurality of pinion teeth to the pinion gear; and, transferring the force from the pinion gear to the output structure via the pinion assembly.

The above aspect can further comprise the step of replacing a carrier bearing in a vehicle driveline with the reversible torque vector multiplier after the step of providing a reversible torque vector multiplier. Preferably, all gears internal to the reversible torque vector multiplier rotate in the same direction, and the reversible torque vector multiplier does not comprise any idler gears. Preferably, the minimal number of teeth mated and engaged as between any two respective internal gears internal to the reversible torque vector multiplier is at least 4 teeth. The input structure and the output structure can be structurally swapped, more specifically the input structure can be fixedly attached to the pinion gear, and the output structure can be fixedly attached to the annular gear, with the pinion gear transferring the rotational force to the annular gear, thereby providing gear reduction rather than gear multiplication between the input structure and the output structure.

In a sixth aspect, disclosed is a method for gear multiplication of a vehicle with a driveline having a stock carrier bearing, comprising: providing a replacement carrier bearing, the replacement carrier bearing comprising an annular assembly, an pinion assembly and a carrier assembly, wherein the annular assembly comprises an input structure and a annular gear comprising a plurality of inward facing annular teeth, wherein the pinion assembly comprises an output structure and a pinion gear comprising a plurality of outward facing pinion teeth, wherein the pinion gear and the annular gear are approximately the same thickness, and wherein the carrier assembly is fixedly attached to the vehicle through one or more carrier bearing attachment bolts; removing an input driveline connector of the driveline from the stock carrier bearing; removing the output driveline connector of the driveline from the stock carrier bearing; removing the one or more carrier bearing attachment bolts, thereby allowing the stock carrier bearing to be removed from the vehicle; removing the stock carrier bearing from the driveline; mounting the stock carrier bearing to the driveline, securing the one or more carrier bearing attachment bolts, thereby attaching the replacement carrier bearing to the vehicle; attaching the input driveline connector of the driveline to the replacement carrier bearing; and, attaching the output driveline connector of the driveline to the replacement carrier bearing.

In the aspect above, a gear reduction ratio between the input driveline connector and output driveline connector can be 25%. The input driveline connector can comprise a half of a universal joint and, and wherein the output driveline connector comprises a half of a universal joint. The vehicle can be a heavy truck. The reversible torque vector multiplier can further comprise a plurality of internal gears, wherein the plurality of internal gears all rotate in the same direction, and wherein the reversible torque vector multiplier does not comprise any idler gears. In the aspect, a plurality of internal gears comprises a plurality of teeth mated and engaged between the plurality of internal gears, wherein the plurality of teeth communicating at any given time is at least 4 teeth.

What is claimed is:

1. A reversible torque vector multiplier for gear multiplication between an input structure and an output structure, comprising:
   an annular assembly comprising the input structure fixedly attached to an annular gear, wherein the annular gear comprises a plurality of annular teeth facing inward;

a pinion assembly comprising the output structure fixedly attached to a single pinion gear, wherein the pinion gear comprises a plurality of pinion teeth facing outward;

wherein the plurality of teeth of the annular gear exceeds in number the plurality of teeth of the pinion gear, and the plurality of pinion teeth and the plurality of annular teeth are approximately mated to each other providing for rotational communication between the annular gear and the pinion gear;

wherein the pinion gear and the annular gear are approximately the same thickness and there are no other gears in the torque vector multiplier;

a carrier assembly that can be fixedly attached to a static structure, comprising a pinion bearing providing the pinion gear to rotate about its axis and an annular bearing providing the annular gear to gear to rotate about its axis;

wherein the carrier assembly situating the pinion assembly and the annular assembly in fixed positions relative to each other, but allowing corresponding rotational movement of the pinion assembly and annular assembly, such that the pinion gear is situated inside the annular gear, and the pinion gear remains in the same relative position relative to the annular gear and that the pinion gear and annular gear rotate in a same plane and in a same direction with parallel axes;

wherein when the input structure rotates the annular gear also rotates, and the communication of the plurality of pinion teeth causes the plurality of annular teeth to rotate the pinion gear within the annular gear, thereby rotating the output structure;

wherein the input structure and the output structure are structurally identical such that they can be swapped;

wherein the input structure is an input connector of a vehicle driveline and the output structure is an output connector of the vehicle driveline; and, wherein the reversible torque vector multiplier replaces a carrier bearing in the vehicle driveline.

2. The reversible torque vector multiplier of claim 1 wherein the vehicle is specified under United States classifications as a class 7 or class 8 heavy truck heavy truck.

3. The reversible torque vector multiplier of claim 2 wherein the reversible torque vector multiplier is reversible, providing for either gear multiplication or gear reduction.

4. The reversible torque vector multiplier of claim 1 wherein the reversible torque vector multiplier does not contain any idler gears.

5. The reversible torque vector multiplier of claim 2 wherein a gear multiplier ratio between the input connector and the output connector is 25%.

6. The reversible torque vector multiplier of claim 1 further comprising a plurality of all teeth, the plurality of all teeth comprising the plurality of pinion teeth and the plurality of annular teeth, wherein the plurality of all teeth mated and communicating as between any two internal gears of the reversible torque vector multiplier is always at least 4 teeth.

7. A method for gear multiplication between an input structure to an output structure, comprising:

providing a reversible torque vector multiplier, the reversible torque vector multiplier comprising an annular assembly, a pinion assembly and a carrier assembly wherein the annular assembly comprises an annular gear comprising a plurality of inward facing annular teeth, wherein the annular gear is fixedly attached to the input structure, wherein the pinion assembly comprises a single pinion gear comprising a plurality of outward facing pinion teeth, wherein the pinion assembly is fixedly attached to the output assembly, wherein the pinion gear and the annular gear are approximately the same thickness and there are no other gears in the torque vector multiplier, and wherein the carrier assembly comprises a pinion bearing providing the pinion gear to rotate about its axis and an annular bearing providing the annular gear to gear to rotate about its axis and wherein the pinion gear and annular gear rotate in a same plane and in a same direction with parallel axes, and wherein the pinion gear is situated inside the annular gear;

providing a rotational force to the input structure;

transferring the force from the input structure to the annular gear via the annular assembly;

transferring the force from the annular gear to the plurality of pinion teeth;

transferring the force from a greater plurality of annular teeth to a lesser plurality of the pinion teeth, the plurality of annular teeth being mated to the plurality of pinion teeth, thereby providing gear multiplication;

transferring the force from the plurality of pinion teeth to the pinion gear;

transferring the force from the pinion gear to the output structure via the pinion assembly; and replacing a carrier bearing in a vehicle driveline with the reversible torque vector multiplier after the step of providing a reversible torque vector multiplier.

8. The method of claim 7 wherein all gears internal to the reversible torque vector multiplier rotate in the same direction, and the reversible torque vector multiplier does not comprise any idler gears.

9. The method of claim 7 wherein the minimal number of teeth mated and engaged as between any two respective internal gears internal to the reversible torque vector multiplier is at least 4 teeth.

10. The method of claim 7 wherein the input structure and the output structure are structurally swapped, more specifically the input structure is fixedly attached to the pinion gear, and the output structure is fixedly attached to the annular gear, with the pinion gear transferring the rotational force to the annular gear, thereby providing gear reduction rather than gear multiplication between the input structure and the output structure.

11. A method for gear multiplication of a vehicle with a driveline having a stock carrier bearing, comprising:

providing a replacement carrier bearing, the replacement carrier bearing comprising an annular assembly, an pinion assembly and a carrier assembly, wherein the annular assembly comprises an input structure and a annular gear comprising a plurality of inward facing annular teeth, wherein the pinion assembly comprises an output structure and a pinion gear comprising a plurality of outward facing pinion teeth, wherein the pinion gear and the annular gear are approximately the same thickness, and wherein the carrier assembly is fixedly attached to the vehicle through one or more carrier bearing attachment bolts;

removing an input driveline connector of the driveline from the stock carrier bearing;

removing the output driveline connector of the driveline from the stock carrier bearing;

removing the one or more carrier bearing attachment bolts, thereby allowing the stock carrier bearing to be removed from the vehicle;

removing the stock carrier bearing from the driveline;

mounting the stock carrier bearing to the driveline, securing the one or more carrier bearing attachment bolts, thereby attaching the replacement carrier bearing to the vehicle;

attaching the input driveline connector of the driveline to the replacement carrier bearing; and, attaching the output driveline connector of the driveline to the replacement carrier bearing.

12. The method of claim 11 wherein a gear reduction ratio between the input driveline connector and output driveline connector is 25%.

13. The method of claim 11 wherein the input driveline connector comprises a half of a universal joint and, and wherein the output driveline connector comprises a half of a universal joint.

14. The method of claim 13 wherein the vehicle is specified under United States classifications as a class 7 or class 8 heavy truck.

15. The method of claim 11 wherein the reversible torque vector multiplier further comprises a plurality of internal gears, wherein the plurality of internal gears all rotate in the same direction, and wherein the reversible torque vector multiplier does not comprise any idler gears.

16. The method of claim 15 wherein the plurality of internal gears comprises a plurality of teeth mated and engaged between the plurality of internal gears, wherein the plurality of teeth communicating at any given time is at least 4 teeth.

* * * * *